United States Patent [19]

Panchuk et al.

[11] 4,140,803

[45] Feb. 20, 1979

[54] SNACK FOODS FROM LEGUME-BASE FLOURS

[75] Inventors: Barry D. Panchuk; Moffat Anderson; Clarence G. Youngs, all of Saskatoon, Canada

[73] Assignee: Canadian Patents and Development Limited, Ottawa, Canada

[21] Appl. No.: 838,316

[22] Filed: Sep. 30, 1977

Related U.S. Application Data

[63] Continuation-in-part of Ser. No. 569,551, Apr. 18, 1975, abandoned.

[51] Int. Cl.² ............................................. A23L 1/20
[52] U.S. Cl. ................................. 426/93; 426/559; 426/560; 426/634; 426/656; 426/438; 426/440; 426/808
[58] Field of Search ............... 426/93, 453, 438, 440, 426/450, 456, 445, 549, 550, 559, 560, 634, 808, 94, 656

[56] References Cited

U.S. PATENT DOCUMENTS

| 3,637,400 | 1/1972 | Mullen et al. | 426/93 |
| 3,780,188 | 12/1973 | Tsen et al. | 426/549 |

FOREIGN PATENT DOCUMENTS

1230105  4/1971  United Kingdom ............... 426/808

*Primary Examiner*—Jeanette M. Hunter
*Attorney, Agent, or Firm*—Alan A. Thomson

[57] ABSTRACT

Snack food products in the form of puffed or expanded chips, are prepared from non-oilseed legume-base flours, which are difficult to process due to stickiness at usual dough solids contents, by using a non-sticky low solids content fluid slurry. The slurry is fed to a drum dryer and successive layers are built up into a multilaminar sheet. When this sheet is dry and the starch therein gelled, it is removed and reduced to pieces of chip size which are then fat-fried. An improved texture and structure is developed using this slurry-multilaminar sheet-fat-fry technique.

13 Claims, No Drawings

SNACK FOODS FROM LEGUME-BASE FLOURS

This application is a continuation-in-part of application Ser. No. 569,551 filed Apr. 18, 1975 and now abandoned.

This invention deals with snack food products in chip-like form, prepared from non-oilseed legume flours, e.g., peas and beans. These pea and bean flours form sticky doughs and pastes at the usually employed solids contents, and have not been processed as such on a commercial scale into snack foods.

Many types of snack foods are known in chip, flake, pellet or extruded forms. Most of the snack foods are rich in carbohydrate and low in protein (2–10%). Increased protein contents (usually to 15–20%) have been achieved by using dried milk solids, cheese, meat or fish protein components. However, these components have presented problems, e.g., many forms of such proteinaceous materials are incompatible with snacks from a flavour viewpoint, while others detract from preferred eating qualities, keeping and physical properties of snacks. It is now desired to prepare quality snack foods of increased nutritional value by simple procedures from field crops.

Soybean proteins have been used with starchy materials to prepare some snack foods of increased protein content (other oilseed proteins such as peanut, cottonseed and sesame seed have also been tried). Usually such soy protein-containing snacks have been hot extruded or toasted. Soy protein when fried gives a tough, brittle material, even though this effect can be diluted somewhat by the use of starchy carriers.

Soy protein is much in demand for protein fortification and for preparing inter alia texturized meatlike products. It is difficult to grow soybeans in good yields in climates and growing season equivalent to the Canadian mid-west. It would be of benefit to prepare high protein snacks from materials other than soybean or oilseed proteins. It would be desirable to prepare chip-like snacks by deep fat frying due to the wide acceptance of this type of snack product.

We have found that non-oilseed legumes such as peas (including cow peas and chick peas), fababeans, mung beans, lima beans, white pea beans and kidney beans provide an excellent material for fat-fried chip-like snacks. These legumes provide a naturally-occurring intimate mixture of protein and starch components that avoid any tendency to turn tough or brittle on fat frying. These legume materials can also be made to expand or puff into a very desirable textured product on frying by appropriate pretreatment.

According to the present invention, a snack product with an improved texture and structure can be obtained, with the forming, cooking, and drying accomplished on a single piece of equipment (before fat frying). The invention includes a method of preparing a puffed or expanded chip-like, relatively-protein-rich snack food product from legume-base flours which form sticky doughs or pastes at solids contents of about 45–70% wt., which comprises (a) providing a finely-ground non-oilseed legume-base flour containing sufficient starch to yield a puffed product on fat-frying and sufficient protein to yield at least about 12% wt. protein in the final product, (b) slurrying this flour with sufficient aqueous liquid to form a non-sticky fluid slurry of solids content below about 45% wt., (c) feeding this non-sticky fluid slurry to a heated drum dryer and rotating the drum dryer through a plurality of revolutions to pick up successive layers of slurry and build up a multilaminar sheet of thickness of at least about 0.3 mm, the dryer surface being maintained at a temperature which will dry the sheet and gel the starch therein, (d) removing the multilaminar dry sheet from the drum dryer surface, reducing the sheet to smaller size pieces, and (e) fat frying these pieces at a temperature sufficient to yield a puffed or expanded chip-like snack food product of light easily-chewed texture and finely bubbled structure.

The invention further includes a puffed or expanded fat-fried, chip-like snack food product of light, easily-chewed, texture and finely bubble structure, prepared by the process described, and comprising protein and gelled starch both derived from pea flour or non-oilseed bean flour, said pea or bean flour being present in at least about 50% by wt. of the total flour in the snack food. The intermediate product, prepared by the process described and adapted for storage is a further part.

A preferred procedure is as follows.

Flours such as pea, fababean, kidney bean, white pea bean flour, are made into a slurry with water containing about 15 to about 45% solids by wt. This slurry is fed into the nip of a double drum dryer, the drums of which are heated to about 110° to 140° C. Some cooking and gelation of the starch in the flours takes place in the slurry held in the nip between the drums. As the drums rotate in opposite directions, a thin layer of the slurry is drawn through the narrow gap between the drums and each drum receives a thin uniform coating. As the drums continue to rotate these thin layers are cooked, gelled and the water evaporated so that by the time the layer re-enters the nip, a thin stable sheet of the desired moisture content, usually below 20% and preferably between 10 and 15%, adheres to each drum. On passing through the nip, another thin layer of slurry is drawn through and a second thin layer coated on each drum which in turn is cooked, gelled and dried as the drums rotate. As the drums continue to rotate a multilaminar sheet is built up to the desired thickness of at least about 0.3 and usually about 0.4–0.8 mm. Sheets up to 1 mm thick can be produced. Since the gap between the drums is not changed during this build up, there is a mechanical working of the sheet each time it passes through the nip. When a sheet of the desired thickness has been obtained, after about 3 to about 20 revolutions of the drums, a doctor blade extending the length of the drums is drawn in against each drum for one revolution removing the built up material as a uniform, dense, pliable, multilaminar sheet. The doctor blades do not have to be drawn against the drums simultaneously but may be operated sequentially. These pliable sheets are then cut or broken into the desired chip-size pieces and subsequently deep fat fried. The cut product before frying is a stable material which may be packaged and stored for at least up to 6 months allowing the production of this half product at a different time and different location than the final frying if this is desirable. If this intermediate product is to be stored, the moisture content may be reduced below 10% for greater shelf life.

The chips are fried at temperatures above about 170° C., preferably from about 185° C. to about 210° C., in any of the edible fats or oils commonly used for such purposes. Only short frying times for these chips are required because of their low moisture and thin nature. On frying, the chips expand or puff because of their laminar build-up and starch and moisture content. The surface that was away from the drum develops a pleasing finely-bubbled texture. The final product has very good mouth feel and disintegrates quickly on chewing and yet has sufficient strength to withstand the mechanical packaging, handling and shipping of the chip or snack food industry.

Any of the non-oilseed legume-base flours or blends thereof may be used as the basic or major component. The starting material should contain sufficient starch to yield a puffed, expanded product on fat-frying, usually from about 30–70% wt. This starch becomes gelled before leaving the heated dryer surface.

Cereals which contain starch and protein in intimate combination may be used in conjunction with the non-oilseed legume material. The cereals are lower in protein content than the legumes (about one half), but when added in equal or minor proportion still give a relatively protein-rich product. Suitable proteinaceous cereal flours which may be added are wheat, corn, and rice, and also potato flour.

The starting materials are ground to a flour by conventional milling practice. If cereals are to be added, the dry flours can be blended — or the cereal added in the next step. The flour is then slurried in an aqueous liquid to swell the particles and dissolve some of the starch which will serve as binder. The slurry solids content is selected within about 15 to about 45% wt. to give a non-sticky fluid consistency. Somewhat higher and lower solids content may be used but with higher solids severe difficulty in handling occurs, and with lower amounts the slurry becomes too fluid with excessive amounts of water to be evaporated later. If desired the cereal flour may be mixed in at this slurry-forming stage. Flavourings or other additives may also be added at this stage.

Many trials, including large scale ones, have been carried out in order to develop a fully satisfactory chip texture and structure.

Attempts to form chips by cooking and drying a single layer of sufficient thickness on a double drum dryer were not successful because this thicker layer could not be uniformly coated on the rolls but resulted in patches of material adhering first to one roll then the other as it emerged from the nip. Uniform sheets could not be produced and the structure of the chips was variable and "ragged". Sheets formed of a single layer on a single drum or belt dryer were of a porous nature because of small holes left by the water vapor escaping through the thick layer during drying. Such chips on deep frying did not puff or expand as the steam formed from moisture in the chip escaped easily through the porous structure. The multilaminar product on the other hand, with its dense uniform nature resulting both from the drying of multiple very thin films and the mechanical working of these films on multiple passes through the nip of the rolls, expanded or puffed and bubbled very effectively due to steam from moisture trapped in the product.

A protein content higher than in the products based on the natural legumes or legumes plus cereals can be achieved by the addition of a protein concentrate. Plant protein concentrates of about 50–70% protein are available. The starch content should not be decreased below about 30%, or the mixture will not puff to the desired extent on deep frying.

The following Examples are illustrative. Control Examples A to C are included to show the unsatisfactory results obtained with a single layer on the dryers. The test results illustrated show the significant improvement obtained when successive layers are formed and built up into a multilaminar sheet which is then fat-fried.

CONTROL EXAMPLE A

Attempts were made to produce sheets of product in a single revolution of the drums of a double drum dryer. The steam pressure was set at 30 p.s.i.g., the drum speed reduced to 1 r.p.m. and the gap between the drums opened to 15/1000 of an inch. On feeding a 40% solids slurry of pea flour into the nip, a very ragged, non-uniform layer was deposited on the drums. As the material emerged from the nip of the drums, it adhered in patches to one or the other drum in a random fashion. Some cooked dried flakes were obtained at the doctor blade but these were porous and crumbly in texture and on deep fat frying did not bubble or expand as with the multilayered product. The final product was judged unsatisfactory in texture and mouth feel.

CONTROL EXAMPLE B

Attempts were made to form sheets in one revolution of a single drum dryer using multiple applicator rolls. A 40% solids slurry of pea flour was fed to each of three applicator rolls located around the periphery of a 24 inch diameter by 48 inch long single drum dryer operated at 20 p.s.i.g. steam pressure. To obtain the desired sheet thickness of 13/1000 inch to 25/1000 inch, the applicator rolls had to be opened to provide a 15/1000 inch gap between the roll and the drum. The slurry adhered in patches to the drum or the applicator roll and even with the three applicators, a very uneven ragged sheet was obtained at the doctor blade. Selection of some of the thicker patches from the sheet gave a product that was of better texture than that obtained in example A but not nearly as good as in example 7 with multiple revolutions of the single drum. On frying these selected parts of the sheet, some non-uniform bubbling occurred but the final product was still not judged satisfactory.

CONTROL EXAMPLE C

Attempts were made to produce sheets of product on a continuous belt dryer. A uniform 30/1000 inch layer of a 40% solids slurry of pea flour was spread onto a steel belt using a double applicator roll. The belt was heated by hot air on both top and bottom. The sheet was removed from the belt with a doctor blade at the tail pulley. The product was crumbly and porous in texture and did not bubble or expand on frying and was judged unacceptable in texture and mouth feel.

EXAMPLE 1

Pin-milled flour from field peas was made into a slurry with water, the slurry containing 30% wt. solids. This slurry was fed onto a double dryer, operated at 20 p.s.i.g. steam pressure, and the drums allowed to rotate 9 times until a film of approximately 0.5 mm thickness had built up. This multilaminar film was removed as a sheet with the doctor blade of the dryer and cut into 1 inch × 1.5 inch rectangles. The material was relatively tough and dense, and contained 11.0% moisture at this point. The rectangles were then deep fried for about 10 seconds in deep fat at a temperature of 170° C. to give a puffed or expanded chip that had a good texture, attractive finely bubbled structure, pleasant cream to yellow colour, and a mild "cereal-like" flavour. These chips were flavoured with cheese, ham or onion flavours by dusting the finished product with salt containing the appropriate flavour. The products were very acceptable snacks of fat content 30% and protein content 18%.

EXAMPLE 2

Using a similar procedure to Example 1, but with pin-milled flour from dehulled fababeans (horsebeans) instead of from peas, equally good results were obtained except for a slight bitter flavour in the deep fried product. This bitter flavour appeared to be masked by the addition of flavoured salt. The fat content was 28% and the protein 22%.

EXAMPLE 3

Snacks were prepared similarly to Example 1, but using pin-milled flour from a mixture of 50% whole hard red spring wheat and 50% whole field peas. A satisfactory puffed product was again obtained except for a darker brown colour due to the wheat bran. The fat content was 33% and the protein 14%. Use of a refined bleached wheat flour instead of whole wheat gave a light-coloured product. The texture, porous structure and flavour were very acceptable.

EXAMPLE 4

Following the procedure of Example 1 with a mixture of flours as in Example 3 except that durum wheat was used in place of the hard red spring type. The resulting snacks were lighter coloured than in Example 3, and were not puffed quite as much as the hard wheat-containing product. Texture, structure and flavour were quite acceptable, with the fat content 30% and the protein 15.3%.

EXAMPLE 5

A mixture of fababeans and about 30% wt. wheat was ground and processed into chip-like snacks according to Example 1. The fababeans tend to bestow a greyish colour to the product. The protein content was 16.2%.

EXAMPLE 6

Kidney beans were processed into puffed chips as in Example 1, with the product having a pink colouration. Texture, the finely bubbled structure, and flavour were all very acceptable. Protein content was 14.7%.

Very acceptable puffed chips have also been obtained using mung beans, cow peas and chick peas. The protein contents were 18.4%, 15.0% and 14.3% respectively.

EXAMPLE 7

Multilaminar sheets could be formed on a single drum dryer as well as on the double drum if multiple revolutions were carried out. A 40% solids slurry of pea flour in water was fed into the nip between the applicator roll and the drum of a 24 inch diameter by 48 inch long single drum dryer. The drum was allowed to make 15 revolutions and a sheet removed by lowering the doctor blade as with the double drum. This sheet has similar characteristics to that obtained on the double drum and the only difficulty encountered was that material tended to build up on the applicator roll and had to be scraped off occasionally. Satisfactory sheets were also obtained by using two applicator rolls and reducing the number of revolutions to 10. Steam pressure in the drums was 20 p.s.i.g. and the drum speed was 7 r.p.m. in both trials. Sheets from both trials were cut by hand into chip size pieces and deep fat fried. They gave the same fine bubbled surface and expansion on frying as obtained with sheets formed on the double drum. The applicator roll on the single drum provided the nip for working of the sheets as the laminations built up.

We claim:

1. A method of preparing a puffed or expanded chip-like, relatively-protein-rich snack food product from legume-base flours which form sticky doughs or pastes at solids contents of about 45–70% wt., which comprises
   (a) providing a finely-ground non-oilseed legume-base flour containing at least about 50% wt. of said non-oilseed legume and at least about 30% wt. starch to yield a puffed product on fat-frying and sufficient protein to yield at least 12% wt. protein in the final product,
   (b) slurrying this flour with sufficient aqueous liquid to form a non-sticky fluid slurry of solids content below about 45% wt.,
   (c) feeding this non-sticky fluid slurry to a heated drum dryer and rotating the drum dryer through a plurality of revolutions to pick up successive layers of slurry and build up a multilaminar sheet of thickness of at least about 0.3 mm, the dryer surface being maintained at a temperature which will dry the sheet and gel the starch therein,
   (d) removing the multilaminar dry sheet from the drum dryer surface, reducing the sheet to smaller size pieces, and
   (e) fat frying these pieces at a temperature above about 170° C. sufficient to yield a puffed or expanded chip-like snack food product of light easily-chewed texture and finely bubbled structure.

2. The method of claim 1 wherein the flour comprises pea or bean flours.

3. The method of claim 1 wherein at least three layers of slurry are picked up and laminated together in succession in step (c).

4. The method of claim 1 wherein the multilaminar sheet thickness is from about 0.4–0.8 mm.

5. The method of claim 1 wherein the fluid slurry solids content in (b) is from about 15–40% wt.

6. The method of claim 1 wherein the dryer is a double drum dryer, the fluid slurry is fed to the nip between the drums, and a multilaminar sheet is built up on each drum and removed periodically.

7. The method of claim 3 wherein from 5 to 20 layers of slurry are picked up and laminated together into the multilaminar sheet.

8. The method of claim 1 wherein the pieces of the sheet from step (d) are stored, before proceeding to step (e).

9. The method of claim 1 wherein the gap setting between the two drums of a double drum dryer, or between the drum and applicator roll of a single drum dryer remains constant and the successive layers are subjected to increasing mechanical pressure and working in the zone between the drums, or between the drum and applicator roll.

10. A puffed or expanded fat-fried, chip-like snack food product of light, easily-chewed, texture and finely bubbled structure, prepared by the process of claim 1, and comprising protein and gelled starch both derived from pea flour or non-oilseed bean flour, said pea or bean flour being present in at least about 50% by wt. of the total flour in the snack food.

11. The snack food product of claim 10 containing in addition, a protein concentrate to give a total protein content of about 20 to about 35% wt.

12. The snack food product of claim 10 containing, in addition, up to 50% wt. of cereal flour based on total flour.

13. An intermediate multilaminar dry product prepared by the process of claim 1, steps (a) to (d), and adapted for storage before fat-frying.

* * * * *